US008973365B2

(12) United States Patent
Corr et al.

(10) Patent No.: US 8,973,365 B2
(45) Date of Patent: Mar. 10, 2015

(54) GAS TURBINE COMBUSTOR WITH MOUNTING FOR HELMHOLTZ RESONATORS

(75) Inventors: Robert Corr, San Diego, CA (US); Peter Sykes, Encinitas, CA (US); Bruno Struck, San Diego, CA (US); Kenneth G. Thomas, San Diego, CA (US); Richard Braeutigam, Alpine, CA (US); Danny Gauce, Chula Vista, CA (US); Alexander Krichever, Carlsbad, CA (US); Vu Phi, San Diego, CA (US); Timothy Caron, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 1168 days.

(21) Appl. No.: 12/915,234

(22) Filed: Oct. 29, 2010

(65) Prior Publication Data

US 2012/0102963 A1 May 3, 2012

(51) Int. Cl.
*F02C 7/24* (2006.01)
*F23M 5/00* (2006.01)
(Continued)

(52) U.S. Cl.
CPC . *F23R 3/002* (2013.01); *F23R 3/44* (2013.01); *F05D 2260/963* (2013.01); *F23R 2900/00014* (2013.01)
USPC ................ 60/725; 60/752; 431/114; 181/207

(58) Field of Classification Search
CPC ............ F23R 2900/00014; F23R 2900/00013; F23R 2900/02; F23R 2900/00; F23R 3/002; F23R 3/34; F23R 3/16; F05D 2260/963
USPC ............. 60/725, 752–760, 796, 800; 431/114
See application file for complete search history.

(56) References Cited

U.S. PATENT DOCUMENTS 4,106,587 A 8/1978 Nash et al.
4,695,247 A * 9/1987 Enzaki et al. ................. 431/352
(Continued)

FOREIGN PATENT DOCUMENTS

JP 2005315473 A 11/2005

OTHER PUBLICATIONS

L. Nord et al, "A $NO_x$ Reduction Project for a GT11 Type Gas Turbine", Proceeding of GT2005, ASME Turbo Expo. 2005: Power of Land, Sea and Air Jun. 6-9, 2005, Reno-Tahoe, Nevada, USA.
(Continued)

*Primary Examiner* — William H Rodriguez
*Assistant Examiner* — Rene Ford
(74) *Attorney, Agent, or Firm* — Finnegan, Henderson, Farabow, Garrett & Dunner, LLP

(57) ABSTRACT

A combustor liner may include an annular inner liner and an annular outer liner with a plurality of air holes thereon. The outer liner may be positioned circumferentially around the inner liner such that an annular cooling space is defined between the inner and the outer liner. The combustor liner may also include at least one resonator coupled to the outer liner such that a base of the resonator is separated from the outer liner to form a gap with an external surface of the outer liner. The combustor liner may also include a throat extending from the base of the resonator penetrating the inner liner and the outer liner. The combustor liner may further include a grommet assembly that allows for relative thermal expansion between the inner liner and the outer liner proximate the throat.

13 Claims, 6 Drawing Sheets

(51) Int. Cl.
*F23R 3/00* (2006.01)
*F23R 3/44* (2006.01)

(56) References Cited

U.S. PATENT DOCUMENTS

| | | | | |
|---|---|---|---|---|
| 4,944,362 | A | 7/1990 | Motsinger et al. | |
| 5,142,871 | A * | 9/1992 | Lampes et al. | 60/756 |
| 5,181,379 | A * | 1/1993 | Wakeman et al. | 60/766 |
| 5,467,592 | A * | 11/1995 | Carletti | 60/761 |
| 5,581,994 | A * | 12/1996 | Reiss et al. | 60/782 |
| 5,687,572 | A * | 11/1997 | Schrantz et al. | 60/753 |
| 6,237,344 | B1 * | 5/2001 | Lee | 60/754 |
| 6,341,485 | B1 * | 1/2002 | Liebe | 60/772 |
| 6,434,821 | B1 * | 8/2002 | Nelson et al. | 29/888.01 |
| 6,464,489 | B1 | 10/2002 | Gutmark et al. | |
| 6,530,221 | B1 | 3/2003 | Sattinger et al. | |
| 6,546,729 | B2 | 4/2003 | Hellat et al. | |
| 6,668,559 | B2 * | 12/2003 | Calvez et al. | 60/796 |
| 6,837,050 | B2 | 1/2005 | Mandai et al. | |
| 6,854,738 | B2 * | 2/2005 | Matsuda et al. | 277/632 |
| 6,920,762 | B2 * | 7/2005 | Wells et al. | 60/799 |
| 7,076,956 | B2 | 7/2006 | Young et al. | |
| 7,080,514 | B2 | 7/2006 | Bland et al. | |
| 7,104,065 | B2 * | 9/2006 | Benz et al. | 60/725 |
| 7,234,306 | B2 * | 6/2007 | Aumont et al. | 60/796 |
| 7,331,182 | B2 | 2/2008 | Graf et al. | |
| 7,334,408 | B2 | 2/2008 | Bethke et al. | |
| 7,337,875 | B2 | 3/2008 | Proscia et al. | |
| 7,448,215 | B2 | 11/2008 | Macquisten et al. | |
| 7,617,688 | B2 * | 11/2009 | Biebel et al. | 60/796 |
| 2003/0163995 | A1 * | 9/2003 | White | 60/800 |
| 2004/0248053 | A1 * | 12/2004 | Benz et al. | 431/114 |
| 2005/0223707 | A1 | 10/2005 | Ikeda et al. | |
| 2006/0123791 | A1 | 6/2006 | MacQuisten et al. | |
| 2008/0041058 | A1 | 2/2008 | Johnson et al. | |
| 2008/0087019 | A1 | 4/2008 | Macquisten et al. | |
| 2008/0092547 | A1 * | 4/2008 | Lockyer et al. | 60/757 |
| 2008/0216481 | A1 * | 9/2008 | Pollarolo | 60/725 |
| 2009/0249791 | A1 * | 10/2009 | Belsom | 60/755 |
| 2011/0120132 | A1 * | 5/2011 | Rudrapatna et al. | 60/752 |

OTHER PUBLICATIONS

S. Tanimura et al., "Advance Dry Low Nox Combustor for Mitsubishi G Class Gas Turbines", Proceedings of ASME Turbo Expo 2008: Power for Land, Sea and Air GT 2008, Jun. 9-13, 2008 Berlin, Germany.

J. Lepers et al., "Investigation of Thermoacoustic Stability Limits of an Annular Gas Turbine Combustor Test-Rig with and without Helmholtz-Resonators," Proceedings of GT2005 ASME Turbo Expo 2005, Jun. 6-9, 2005, Reno-Tahoe, Nevada, USA.

* cited by examiner

GAS TURBINE COMBUSTOR WITH MOUNTING FOR HELMHOLTZ RESONATORS

TECHNICAL FIELD

The present disclosure relates generally to a gas turbine combustor, and more particularly, to a gas turbine combustor with mounting for Helmholtz resonators.

BACKGROUND

In combustion chambers (called combustors) of turbine engines, acoustic vibrations can occur during the combustion process under certain conditions due to instabilities in the combustion process. In the industry, these high frequency acoustic vibrations are sometimes referred to as oscillations. Oscillations have been found to interfere with optimal operation of the turbine engine. Once oscillations occur, they can continue until the source of energy causing the oscillations is removed, or until system variables are changed, to shift the operation of the turbine engine to a non-oscillations operational range. However, the mechanics of how the operational characteristics interact to produce oscillations is not well understood. Therefore, changing the operational characteristics of the turbine engine to eliminate oscillations may be difficult since it is difficult to predict oscillations in a system with sufficient accuracy. Therefore, a positive structural means, such as a Helmholtz resonator, may be designed into the combustor to damp the high frequency acoustic vibrations.

A Helmholtz resonator, in its simplest form, consists of an enclosed volume (cavity) containing air connected to the combustion chamber with an opening. Due to a pressure wave resulting from the combustion process, air is forced into the cavity increasing the pressure within the cavity. Once the external driver that forced the air into the cavity is gone, the higher pressure in the cavity will push a small volume of air (plug of air) near the opening back into the combustion chamber to equalize the pressure. However, the inertia of the moving plug of air will force the plug into the combustion chamber by a small additional distance (beyond that needed to equalize the pressure), thereby rarifying the air inside the cavity. The low pressure within the cavity will now suck the plug of air back into the cavity, thereby increasing the pressure within the cavity again. Thus, the plug of air vibrates like a mass on a spring due to the springiness of the air inside the cavity. The magnitude of this vibrating plug of air progressively decreases due to damping and frictional losses. The energy of the pressure wave generated within the combustor is thus dissipated by resonance within the Helmholtz resonator. Energy dissipation is optimized by matching the resonance frequency of the Helmholtz resonator to the acoustic mode of the combustor. Typically, frequency matching (or "tuning") of a Helmholtz resonator is accomplished by changing the dimensions of the Helmholtz cavity and the opening.

An array of Helmholtz resonators can be constructed using an empty space between interior and exterior liners of a double walled combustor. However, in such double walled combustors, the space between the liners is used to supply cooling air to the combustor walls. Therefore, locating the Helmholtz resonators in this space makes them a part of the cooling system. Helmholtz resonators being a part of the cooling system, reduces the ability to tune the Helmholtz resonators by changing the cavity and opening dimensions, without impacting the cooling of the combustor. This limitation reduces the effectiveness of the Helmholtz resonators in controlling oscillations. It is therefore desirable to locate the Helmholtz resonators close to the heat release zone of the combustor, but independent of the combustion chamber cooling system.

One implementation of a Helmholtz resonator in a gas turbine combustion chamber is described in U.S. Pat. No. 7,104,065 (the '065 patent) issued to Benz et al. on Sep. 12, 2006. In the '065 patent, Helmholtz resonators are located outside the outer liner of a double walled combustor. A throat section that penetrates through the inner and outer liner fluidly couples the resonator cavity with the combustor volume within the inner liner. In the '065 patent, a welded joint is used between the throat section of the resonator and the wall of the combustor to ensure a gas tight seal. By locating the Helmholtz resonator outside the space between the inner and outer liner, the '065 patent separates the resonator cavity from the cooling air path between the inner and outer liner.

Although the Helmholtz resonator of the '065 patent may be tuned without affecting the gap between the inner and the outer liner, the combustor of the '065 patent may have other drawbacks. For instance, the Helmholtz resonators on the outer liner may affect the cooling air flow into the space between the inner and the outer liner. Furthermore, thermo-mechanical stresses may develop at the welded joints between the throat and the liner due to thermal expansion mismatch between these parts. These thermo-mechanical stresses may eventually lead to cracks in the welded joints (or the attached parts) that compromise the reliability of the combustor.

The present disclosure is directed at overcoming one or more of the shortcomings set forth above.

SUMMARY

In one aspect, a combustor liner is disclosed. The combustor liner may include an annular inner liner and an annular outer liner with a plurality of air holes thereon. The outer liner may be positioned circumferentially around the inner liner such that an annular cooling space is defined between the inner and the outer liner. The combustor liner may also include at least one resonator coupled to the outer liner such that a base of the resonator is separated from the outer liner to form a gap with an external surface of the outer liner. The combustor liner may also include a throat extending from the base of the resonator penetrating the inner liner and the outer liner. The combustor liner may further include a grommet assembly that allows for relative thermal expansion between the inner liner and the outer liner proximate the throat.

In another aspect, a resonator assembly for a gas turbine engine is disclosed. The resonator assembly may include a circumferential first support band including an array of perforations thereon. The first support band may include a shape resembling a frustum of a cone. The resonator assembly may also include a substantially cylindrical second support band coupled to the first support band to form a raised mounting structure for a resonator. The resonator assembly may also include at least one resonator mounted on the second support band, and a resonator throat coupled to the at least one resonator extending through the raised mounting structure. The resonator throat may be configured to fluidly couple the at least one resonator to the gas turbine engine.

In a further aspect, a method of operating a turbine engine is disclosed. The turbine engine may include a double walled combustor with an inner liner, an outer liner, and an annular cooling space between the inner and the outer liners. The outer liner may include a plurality of air holes that allow air flow into the cooling space. The method may include damping acoustic vibrations in the combustor using at least one resonator. The at least one resonator may be coupled to the outer liner such that a base of the least one resonator is positioned proud of an external surface of the outer liner. The method may also include allowing differential thermal expansion between the inner liner and the outer liner in the vicinity of a throat of the resonator by a grommet assembly. The grommet assembly may be configured to couple the throat to the combustor while allowing differential thermal expansion between the inner liner and the outer liner proximate the throat.

DETAILED DESCRIPTION

Figure 1:
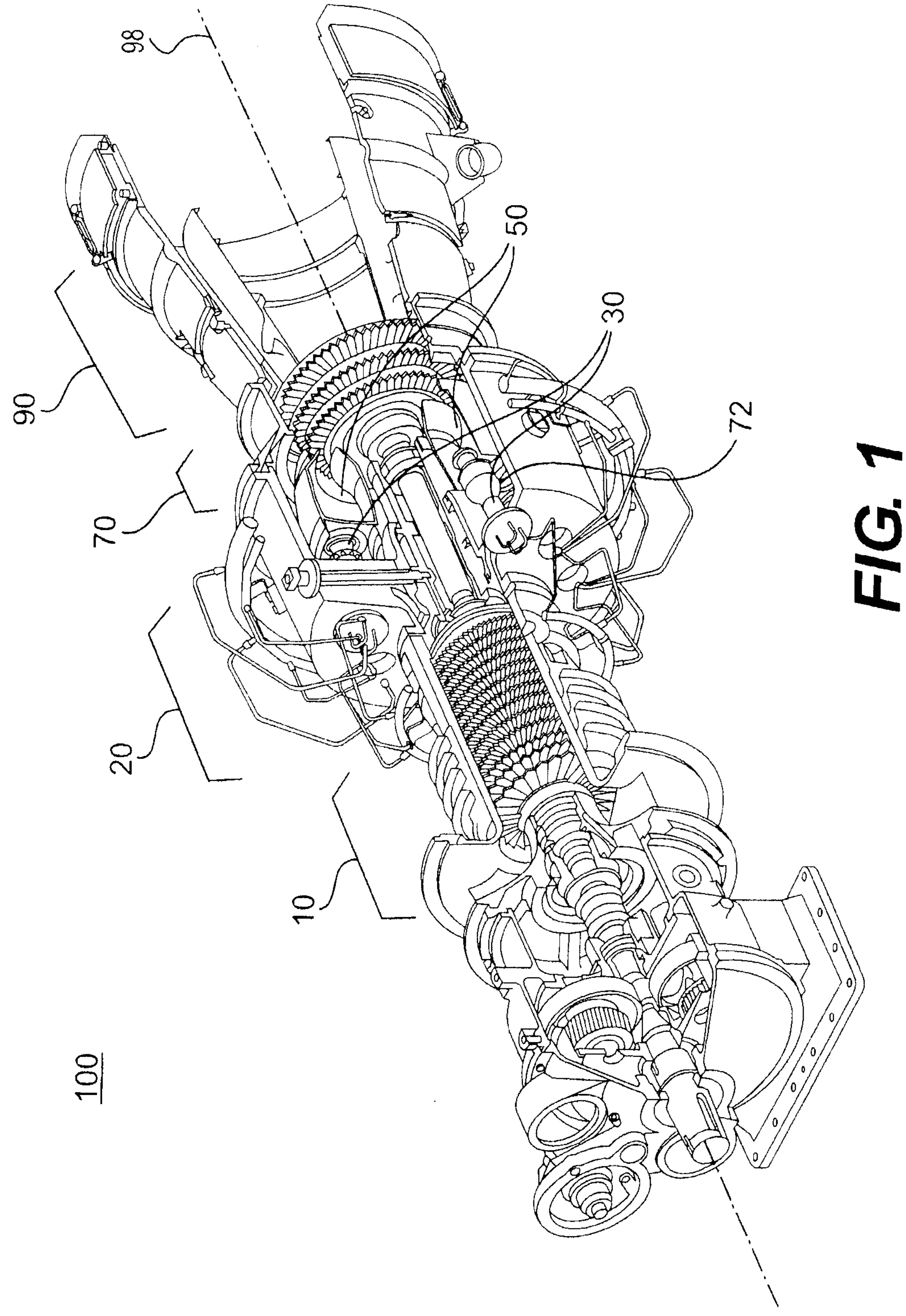
FIG. 1 is a cutaway-view illustration of an exemplary disclosed turbine engine.

FIG. 1 illustrates an exemplary gas turbine engine (GTE) 100. GTE 100 may have, among other systems, a compressor system 10, a combustor system 20, a turbine system 70, and an exhaust system 90 arranged lengthwise along an engine axis 98. Compressor system 10 may compress air to a compressor discharge pressure and deliver the compressed air to an enclosure 72 of combustor system 20. The compressed air may then be directed from enclosure 72 into one or more fuel injectors 30 positioned therein. The compressed air may be mixed with a fuel in fuel injector 30, and the mixture may be directed to a combustor 50. The fuel-air mixture may ignite and burn in combustor 50 to produce combustion gases at a high temperature and pressure. These combustion gases may be directed to turbine system 70. Turbine system 70 may extract energy from these combustion gases, and direct the exhaust gases to the atmosphere through exhaust system 90. The general layout of GTE 100 illustrated in FIG. 1, and described above, is only exemplary and the combustors of the current disclosure may be used with any configuration and layout of GTE 100.

Figure 2:
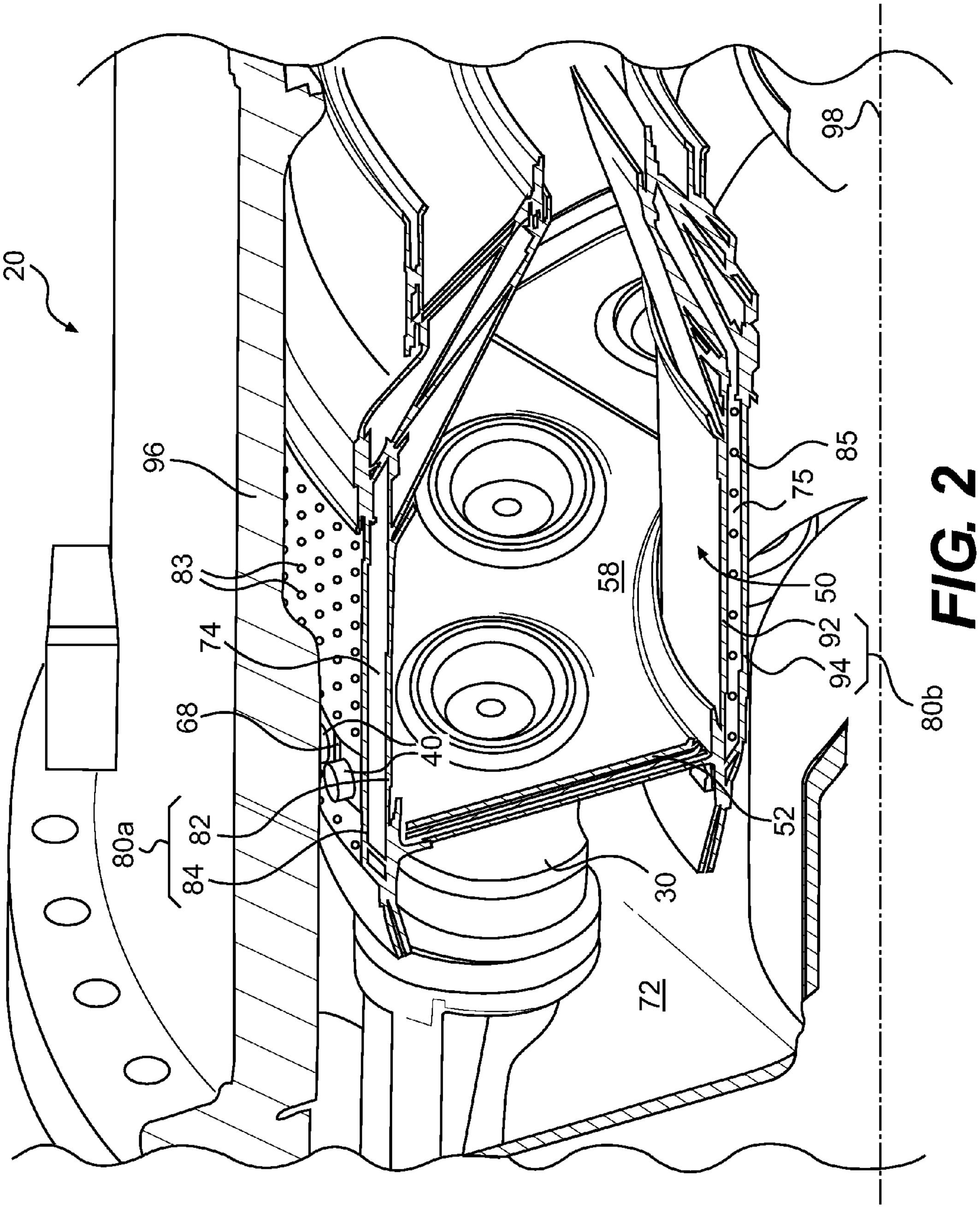
FIG. 2 is a cutaway-view illustration of an exemplary combustor system of the turbine engine of FIG. 1.

FIG. 2 is a cut-away view of combustor system 20 showing a plurality of fuel injectors 30 fluidly coupled to combustor 50. In the embodiment of FIG. 2, combustor 50 is positioned within an outer casing 96 of combustor system 20, and annularly disposed about engine axis 98. Outer casing 96 and combustor 50 define the enclosure 72 between them. As discussed with reference to FIG. 1, enclosure 72 contains compressed air at compressor discharge pressure and temperature. Combustor 50 includes an outer combustor wall **80*a* and an inner combustor wall 80*b* annularly disposed about the engine axis 98. The outer and the inner combustor walls (80*a*, 80*b*) are joined together at an upstream end by a dome assembly 52 to define a combustor volume 58 therebetween. Combustor volume 58 may be an annular space bounded by the inner and outer combustor walls (80*a*, 80*b*) that extend from dome assembly 52 to a downstream end along engine axis 98. Combustor volume 58 is fluidly coupled to turbine system 70 at the downstream end. A plurality of fuel injectors 30, positioned symmetrically about engine axis 98 on dome assembly 52, direct a fuel-air mixture to combustor volume 58 for combustion. This fuel-air mixture burns in combustor volume 58, proximate the upstream end (combustion zone), creating high pressure and high temperature combustion gases. These gases are directed to turbine system 70 through the downstream end of combustor 50. It should be noted that the general configuration of combustor system 20 described here (and illustrated in FIG. 2**) is exemplary only, and that several variations are possible. Since these different configurations are well known in the art, for the sake of brevity, discussion of the different possible configurations is not provided here.

The combustion of fuel-air mixture within combustor volume 58 heats the combustor walls (**80*a* and 80*b*). For increased reliability and performance, it is desirable to cool these walls. The outer combustor wall 80*a* includes an inner liner 82 and an outer liner 84, and the inner combustor wall 80*b* includes an inner liner 92 and an outer liner 94. The inner liners 82, 92 and the outer liners 84, 94 define cooling spaces 74, 75 between them. The outer liners 84, 94 include a plurality of air holes 83, 85 that direct high pressure air from enclosure 72 to impinge on, and cool the inner liners 82, 92**. This technology of impingement cooling the combustor walls is referred to in the industry as Augmented Backside Cooled (ABC) technology. It is known that the use of ABC technology decreases the emission of pollutants into the atmosphere.

The combustion in the combustor volume 58 may also create instabilities manifested by pressure and acoustic oscillations (pressure waves) within combustor volume 58. When the frequency of these oscillations couple with the acoustic mode of the combustor 50, the resulting structural vibrations may damage GTE 100. Therefore, an annular array of Helmholtz resonators 40 ("resonators 40") are provided in combustor 50 to damp these oscillations. These resonators 40 may be adapted to dampen the oscillations that occur at frequencies close to the acoustic modes of combustor 50. For improved damping characteristics, these resonators 40 may be positioned at the upstream end of combustor 50 (that is, in the combustion zone of combustor volume 58). The array of resonators 40 are coupled to the outer liner 84 of the outer combustor wall **80*a* and are adapted to be fluidly coupled to the combustor volume 58. Any type of resonator known in the art may be used as resonators 40. In some embodiments, resonators 40 may include purge holes (not shown) to allow cooling air flow into the resonators 40**.

These resonators 40 are attached to the outer liner 84 such that the air holes 83 of the outer liner 84 in the attachment region are not blocked. Blocking these air holes 83 may prevent compressed air from entering the cooling space 74 and impinging on a region of the inner liner 82 in the vicinity of the blocked holes. Since the resonators 40 are located in the combustion zone of the combustor 50, blocking the air holes 83 in this region may unacceptably increase the temperature of the inner liner 82 in the combustion zone. To prevent blocking the air holes 83 in the attachment region, the resonators 40 are mounted proud of the exterior surface of the outer liner 84 such that a gap exists between the base **40*a* (shown in FIG. 4A) of the resonators 40 and external surface of the outer liner 84**.

Figure 3A:
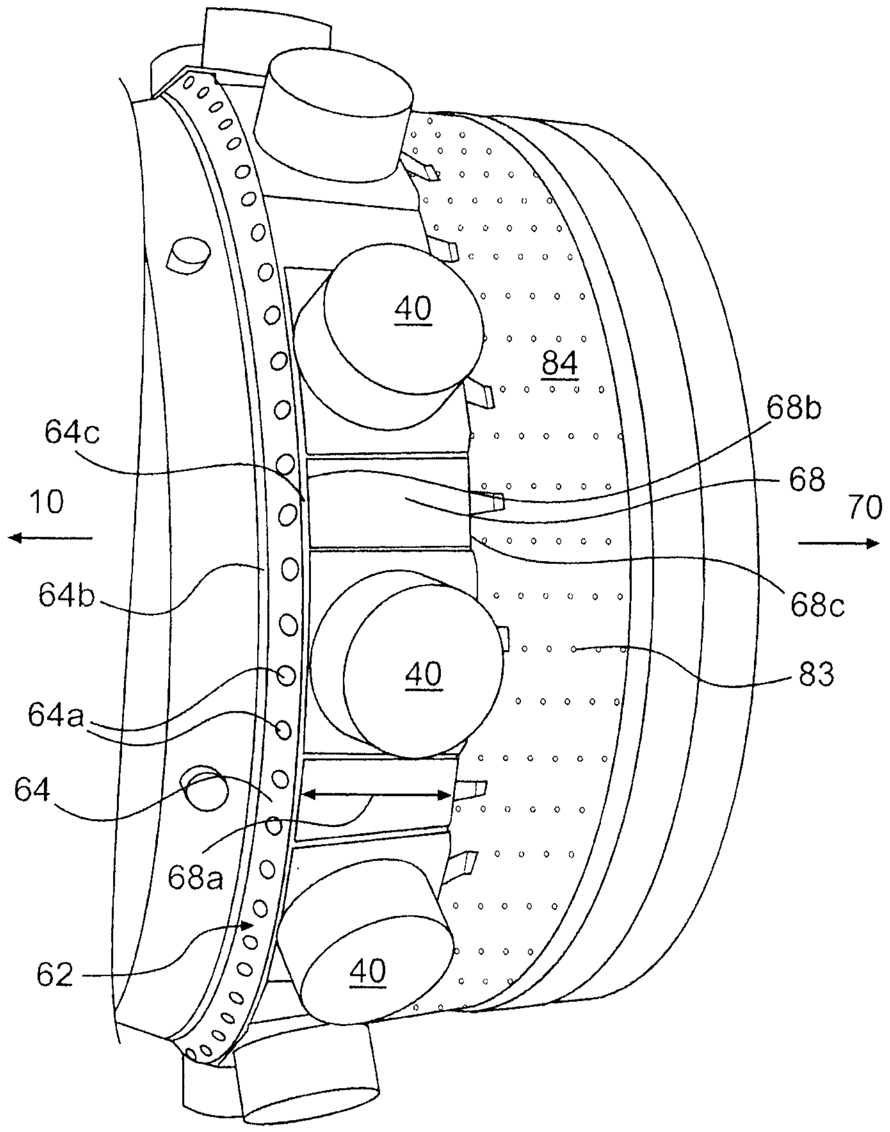
FIGS. 3A and 3B are external views of an exemplary combustor system of the turbine engine of FIG. 1.
Figure 3B:
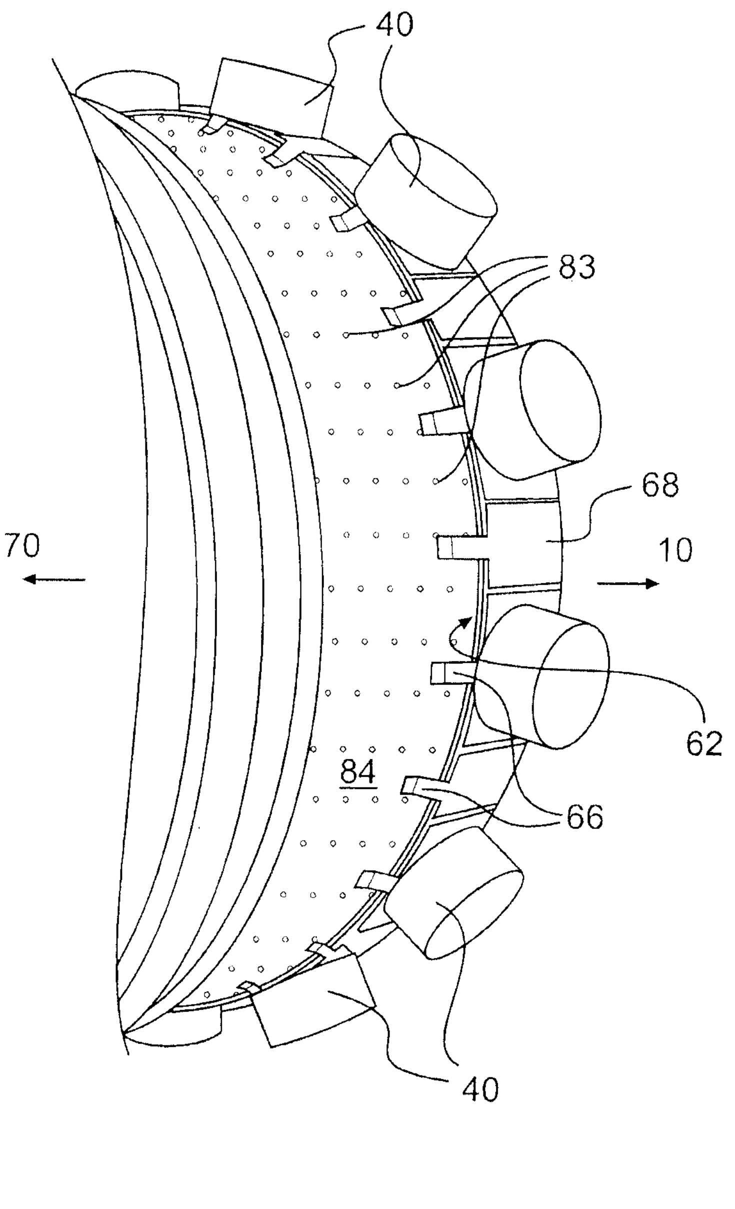

FIGS. 3A and 3B show illustrations of the exterior surface of outer liner 84 with the array of resonators 40 attached thereon. FIG. 3A shows a view of the exterior surface with the compressor system 10 on the left and the turbine system 70 on the right, and FIG. 3B shows a view with the turbine system 70 on the left and the compressor system 10 on the right. As seen in FIGS. 3A and 3B, the resonators 40 are mounted on combustor 50 such that a gap 62 exists between the base of the resonators 40 and the exterior surface of the outer liner 84. Resonators 40 may be attached to the combustor 50 using a mounting that is configured to provide this gap 62 between the resonators 40 and outer liner 84. In the embodiment illustrated in FIGS. 3A and 3B, this mounting includes two circumferential support bands—a first support band 64 and a second support band 68—disposed on the outer liner 84 to provide a raised mounting surface for the resonators 40. These circumferential support bands may be attached to the outer liner 84 by welding or by any other attachment techniques known in the art.

First support band 64 (seen in FIG. 3A) is a component having a shape resembling a frustum of a hollow cone. First support band 64 may include a first end 64*b* having a diameter substantially equal to (or slightly greater than) the external diameter of the outer liner 84. First support band 64 may also include an opposite second end 64*c* having a diameter that is larger than the diameter of the first end 64*b* by about twice the thickness of gap 62. Between first end 64*b* and second end 64*c*, first support band 64 includes a plurality of openings 64*a*. These plurality of openings 64*a* may be annularly disposed around first support band 64, and may be adapted to allow air flow therethrough. Openings 64*a* allow air from enclosure 72 to enter gap 62 between second support band 68 and outer liner 84. From gap 62, this cooling air may enter cooling space 74 through the unobstructed air holes 83 under the second support band 68. This cooling air may impinge on and cool the inner liner 82 in the combustion zone. The thickness of gap 62, and the number and size of the openings 64*a*, may be configured to enable sufficient flow of cooling air into cooling space 74. In the embodiment illustrated in FIGS. 3A and 3B, the thickness of gap 62 may be between about ¼ inch (6.35 mm) and 1 inch (25.4 mm), the size of openings 64*a* may be between about ¼ inch (6.35 mm) and 1 inch (25.4 mm), and the number of openings 64*a* may be about 80. It is believed that openings 64*a* of this configuration allow for adequate cooling of the inner liner 82. In general, about 20-150 of ¼ inch (6.35 mm) to 1 inch (25.4 mm) holes may be annularly disposed on first support band 64. Second end 64*c* of first support band 64 may be attached to second support band 68.

Second support band 68 is a component having a shape resembling a hollow cylinder, and may include a third end 68*b* that is attached to the second end 64*c* of first support band 64. Second support band 68 may also include an opposite fourth end 68*c* that extends along engine axis 98 by a length 68*a*. Fourth end 68*c* may be attached to the external surface of outer liner 84 using a plurality of brackets 66 such that an annular gap 62 exists between the second support band 68 and the external surface of the outer liner 84. Second support band 68 may have a diameter that is greater than the diameter of the external surface of the outer liner 84 by about twice the thickness of gap 62. The second support band 68 may provide a mounting surface for the resonators 40 that stands-off from the outer liner 84 by gap 62. Between third end 68*b* and fourth end 68*c*, second support band 68 may include openings (visible in FIG. 4A) that allow the resonators 40 to be fluidly coupled to combustor volume 58. In some embodiments, second support band 68 may also include additional openings that allow air from enclosure 72 to enter gap 62.

In general, first support band 64, second support band 68 and brackets 66 may include any material, such as stainless steel, nickel-based alloys, etc. In some embodiments, these components may include the same material as outer liner 84. It should be noted that the description of first support band 64, second support band 68 and brackets 66 are exemplary only, and many modifications can be made to these components without departing from the scope of the current disclosure. It should also be noted that although components of a specific mounting (that includes first support band 64, second support band 68 and brackets 66) are discussed here, resonators 40 may be attached to the combustor 50 using alternative mountings that do not block air flow into the cooling space 74 between the liners through the air holes 83 in the resonator attachment region. For instance, in some embodiments, the first support band 64, the second support band 68, and the brackets 66 may be combined to form one circumferential part that is attached to the outer liner 84.

Figure 4A:
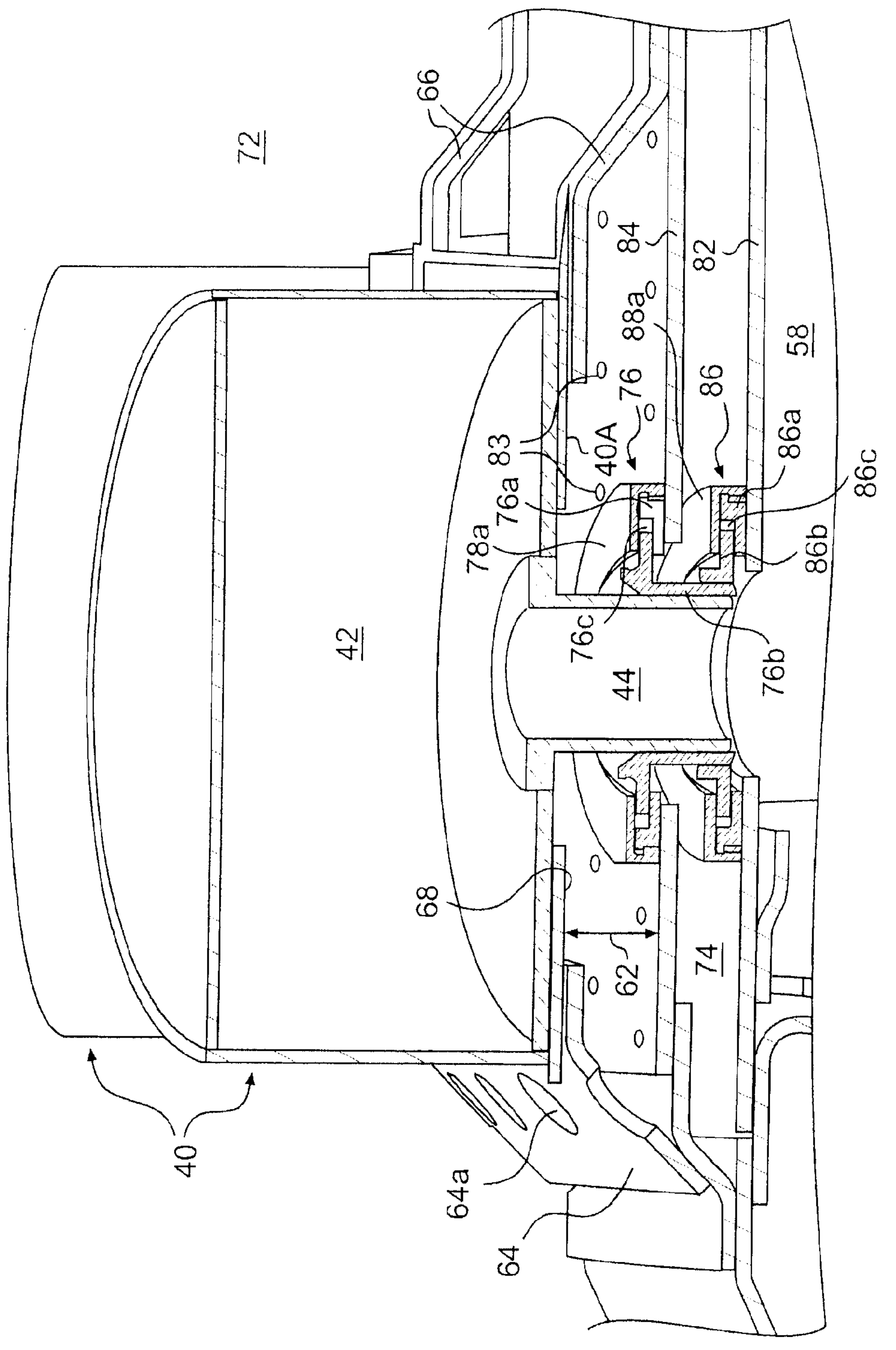
FIG. 4A is cutaway-view illustration a Helmholtz resonator attached to the combustor of the turbine engine of FIG. 1.

FIG. 4A illustrates a sectional view of resonator 40 attached to combustor 50. As can be seen in FIG. 4A, resonator 40 is mounted on the outer liner 84 in such a manner that gap 62 is provided between the base 40*a* of the resonator 40 and the external surface of the outer liner 84. And, the openings 64*a* in the first support band 64 and the space between the brackets 66 allow compressed air from enclosure 72 to enter gap 62 between the resonator 40 and the outer liner 84. This compressed air continues to flow into cooling space 74 through the air holes 83 to impinge on and cool the inner liner 82.

The resonators 40 include a resonator cavity 42 that is fluidly coupled to the combustor volume 58 to dampen combustion induced oscillations that occur in the combustor volume 58. The general function of a resonator is well known in the art, and therefore will not be described in this disclosure. Resonator cavity 42 may be fluidly coupled to combustor volume 58 by a throat 44 of the resonator. Throat 44 may be a cylindrical conduit that extends from the base 40*a* of a resonator 40 to protrude through the inner and outer liners 82, 84 of outer combustor wall 80*a*. During operation of GTE 100, the temperature of the inner liner 82 proximate throat 44 will approximate the temperature of the flame in combustor volume 58, and the temperature of the outer liner 84 proximate throat 44 will approximate the temperature of the air in enclosure 72 (discharge temperature of compressor). Since there could be a large difference between these two temperatures, there could be a correspondingly large difference in thermal expansion between the inner and the outer liner 82, 84 proximate throat 44. Preventing the inner and the outer liners 82, 84 in this region to expand differently in response to the different temperatures may induce large thermo-mechanical stresses thereon. Since throat 44 penetrates through the two liners to fluidly couple the resonator cavity 42 to combustor volume 58, the throat 44 may pin a region of the outer core 84 (the region that the throat penetrates through) to a region of the inner core 82 (the region that the throat penetrates through) and restrict relative thermal expansion/contraction between these regions of the inner and the outer liner 82, 84. Restricting differential thermal expansion of the inner and the outer core, proximate the region where the throat 44 penetrates through, may induce large thermo-mechanical stresses in throat 44 and the inner and the outer liner 82, 84. To accommodate differential thermal expansion between the inner and outer liner 82, 84 without inducing large stresses in throat 44 and the combustor wall, sliding grommets 76, 86 are provided at the locations where the throat 44 penetrates the inner and outer liners 82, 84. Sliding grommets 76, 86 also provide for relative displacement between the throat 44 and the inner and outer liners 82, 84 in an axial direction (direction along the length of throat 44). This axial relative displacement allows the throat 44 to freely expand/contract in the axial direction (along the length of throat 44) in response to different temperatures at different regions of the throat 44. Additionally, this capability of axial relative displacement between the throat and the liners may allow the inner liner 82 to radially expand (or bulge) in response to an increase in pressure in combustor volume 58 without inducing stresses in the throat or the liners.

Figure 4B:
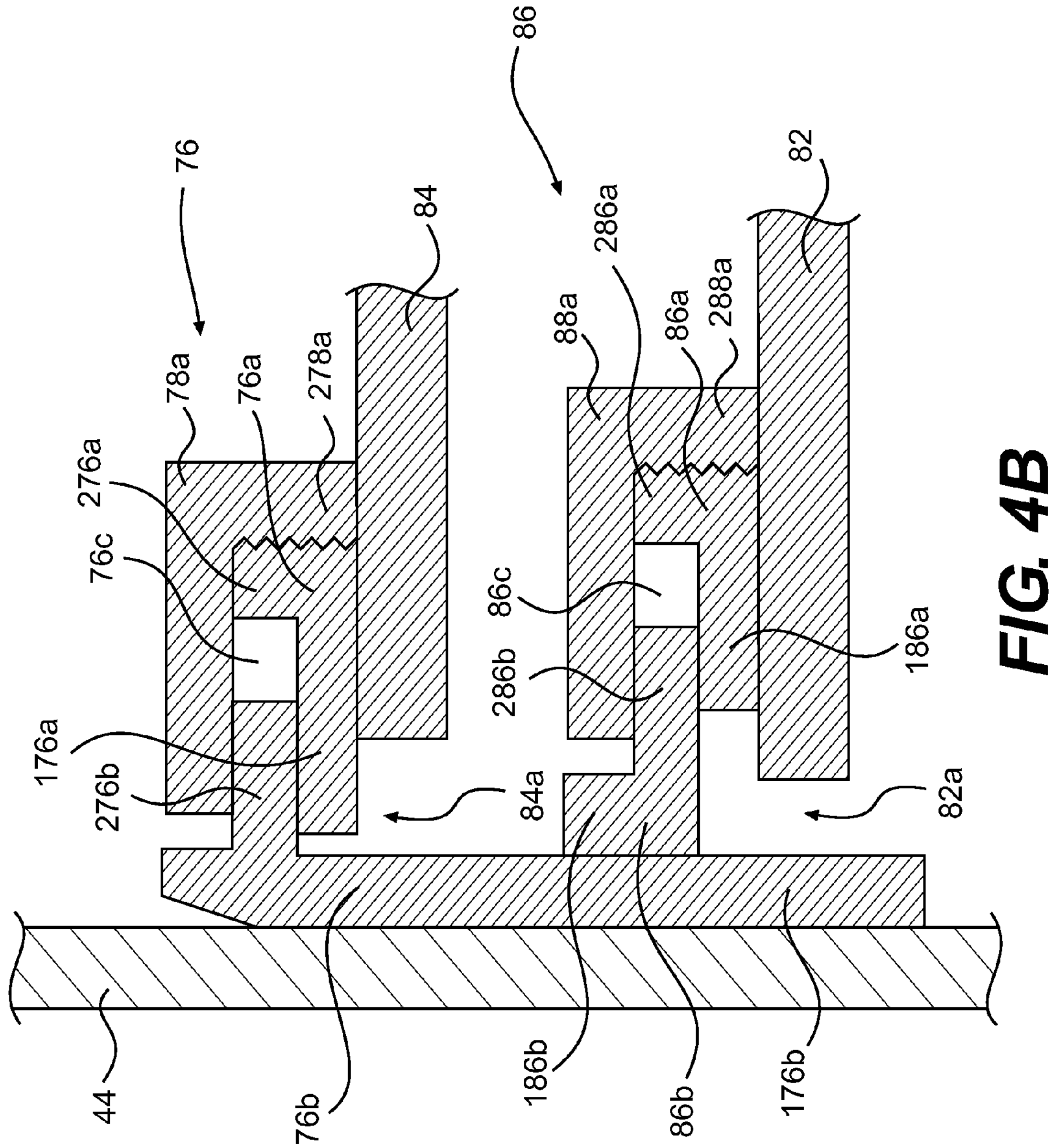
FIG. 4B is a cross-sectional view illustration of exemplary grommets attached to the combustor walls of the turbine engine of FIG. 1

Sliding grommets 76, 86 may include first sliding grommet 76 between the throat 44 and the outer liner 84, and a second sliding grommet 86 between the throat 44 and the inner liner 82 respectively. First and second sliding grommets 76, 86 may include components that may together be adapted to accommodate a thermal expansion mismatch between the inner and the outer liners 82, 84 without inducing large stresses in throat 44 and the liners. These grommets may include materials that are the same as the materials of the liner or may include different materials. FIG. 4B is a schematic that illustrates a cross-sectional view of the first and second sliding grommets 76, 86. In the discussion that follows, reference will be made to both FIGS. 4A and 4B. First sliding grommet 76 may include a first part **76*a*, and the second sliding grommet 86 may include a third part 86*a* that are attached to the outer liner 84 and the inner liner 82, respectively. First part 76*a* and third part 86*a* may include a ring shaped component having a substantially L-shaped cross-sectional shape. One leg 176*a* of the substantially L-shaped cross-section of the first part 76*a* may be attached to the outer liner 84 and the other leg 276*a* may extend substantially perpendicularly therefrom. Similarly, one leg 186*a* of the substantially L-shaped cross-section of the third part 86*a* may be attached to the inner liner 82 and the other leg 286*a* may extend substantially perpendicularly therefrom. First sliding grommet 76 may also include a substantially cylindrical second part 76*b* having a substantially L-shaped cross-sectional shape. One leg 176*b* of the second part 76*b* may be slidably attached to throat 44 and the other leg 276*b* may extend substantially perpendicularly therefrom. Second grommet 86 may include a ring shaped fourth part 86*b* having a substantially L-shaped cross-sectional shape. One leg 286*b* of the fourth part 86*b* may be slidably attached to the leg 186*a* of the third part 86*a*** and the other leg may extend substantially perpendicularly therefrom.

To couple a resonator 40 with combustor 50, the resonator 40 may be positioned on second support band 68 such that the throat 44 of the resonator 40 extends into combustor volume 58 through openings **82*a* and 84*a* of inner and outer liner respectively. In this orientation, base 40*a* of the resonator 40 is rigidly attached to the surface of the second support band 68. When the resonator 40 is thus positioned, leg 276*b* of the second part 76*b* may slidably mate with leg 176*a* of the first part 76*a* of first sliding grommet 76, and leg 186*b* of the fourth part 86*b* may slidably mate with leg 176*b* of the second part 76*b*. An attachment cap 78*a* is secured over first part 76*a* and second part 76*b* of the first sliding grommet 76 to substantially gastightingly secure the components together. The attachment cap 78*a* may also include a substantially L-shaped cross-sectional shape. To couple first part 76*a* with second part 76*b*, one leg 278*a* of the attachment cap 78*a* may include attachment features, such as, for example, threads, that mate with corresponding attachment features on leg 276*a* on an outer surface of first part 76*a*. Second sliding grommet 86 may also include a similar attachment cap 88*a* that substantially gastightingly couples third part 86*a* and fourth part 86*b* of second sliding grommet 86 together. After attachment, legs 276*b* and 276*a* of the first sliding grommet 76 includes a first gap 76*c*, and legs 286*b* and 286*a* of the second sliding grommet 86 includes a second gap 86*c* that are adapted to accommodate a thermal expansion mismatch between the inner and the outer liner 82, 84 without inducing large stresses on throat 44 and the liners (inner liner 82 and outer liner 84). To accommodate the thermal expansion mismatch, the inner liner 82 may expand to increase or decrease the second gap 86*c* and the outer liner 84 may expand to increase or decrease the first gap 76*c* without inducing stresses in the components that are coupled together. Thus, the sliding grommets 76, 86** allow for relative thermal expansion between the inner liner and the outer liner proximate the throat. The slidable coupling of the throat to the liners also allow for axial relative displacement between the throat and the liners to accommodate changes in throat length due to a temperature gradient. Allowing these relative displacements prevent the introduction of thermo-mechanical stresses in the liners and the throat.

It should be noted that the structure of the first and second sliding grommets 76, 86 discussed herein is exemplary only, and other embodiments may include grommets having a different structure. In general any grommet that allows the inner and the outer liner 82, 84 to expand by different amounts without inducing significant amount of stresses in the resonator and the combustor wall components, while gastightingly coupling the resonator to the combustor, may be used to couple resonators 40 to outer liner 84.

INDUSTRIAL APPLICABILITY

The disclosed gas turbine combustor with mounting for Helmholtz resonators may be used in any application where Helmholtz resonators are applied without affecting the cooling of the combustor liners. The operation of a turbine engine with a disclosed combustor having mounting for Helmholtz resonators will now be explained.

An array of resonators 40 may be positioned on mounting (that includes first support band 64, second support band 68 and brackets 66) and fluidly coupled to combustor 50 such that a gap exists between the base of the resonators 40 and the external surface of the outer liner 84. During operation, air may be drawn into GTE 100 and compressed using compressor system 10 (See FIG. 1). This compressed air may be directed to enclosure 72, and from there into combustor 50, through fuel injectors 40 positioned therein. Air from enclosure 72 may also be directed into cooling space 74 between the inner and the outer liners 82, 84 of the combustor 50 to impinge on and cool the inner liner 82. The mounting that couples the resonators 40 to the combustor 50 may be such that air flow into the cooling space 74 through air holes 83 of the outer liner 84 are not blocked. The resonators 40 may also be coupled to the combustor 50 such that grommets (first sliding grommet 76 and second sliding grommet 86) are provided between the throat 44 of the resonator 40 that penetrates the liners and the inner and the outer liner 82, 84. These grommets allow the inner and the outer liner 82, 84 to expand differently without inducing significant stresses in the throat and the combustor liners, while gastightingly coupling the resonator to the combustor.

Since the resonators 40 and the mounting of these resonators 40 do not block the air holes 83 in the outer liner 84, cooling of the combustor 40 remains unaffected due to the presence of the resonators 40. Also, since the attachment between the resonators 40 and the combustor wall **80*a* allows for differential thermal expansion between the layers of the combustor wall 80*a***, thermo-mechanical stresses induced in these components are minimized.

It will be apparent to those skilled in the art that various modifications and variations can be made to the disclosed combustor with mounting for Helmholtz resonators. Other embodiments will be apparent to those skilled in the art from consideration of the specification and practice of the disclosed combustor. It is intended that the specification and examples be considered as exemplary only, with a true scope being indicated by the following claims and their equivalents.

What is claimed is:

1. A combustor liner, comprising:

an annular inner liner;

an annular outer liner including a plurality of air holes thereon, wherein the outer liner is positioned circumferentially around the inner liner such that an annular cooling space is defined between the inner liner and the outer liner;

a circumferential first support band including an array of perforations thereon, the first support band including a shape resembling a frustum of a cone;

a substantially cylindrical second support band coupled to the first support band to form a raised mounting structure for a resonator;

a plurality of resonators annularly mounted on the second support band such that a base of each of the resonators is separated from the outer liner to form a gap with an external surface of the outer liner;

a resonator throat extending from the base of each of the plurality of resonators, extending through the raised mounting structure, and penetrating the inner liner and the outer liner, the resonator throats being configured to fluidly couple the plurality of resonators to the gas turbine engine; and a grommet assembly associated with each of the resonator throats and configured to allow relative thermal expansion between the inner liner and the outer liner proximate each of the resonator throats.

2. The combustor liner of claim 1, wherein at least one of the plurality of air holes on the outer liner is positioned below the base of at least one of the plurality of resonators, and the at least one resonator is coupled to the outer liner such that air flow into the cooling space through the at least one air hole is not blocked.

3. The combustor liner of claim 1, wherein each of the plurality of resonators is coupled to the outer liner such that axial relative movement between the resonator throat of each of the plurality of resonators and at least one of the inner liner and the outer liner is permitted.

4. The combustor liner of claim 1, wherein each of the grommet assemblies includes a first sliding grommet between the associated resonator throat and the outer liner and a second sliding grommet between the associated resonator throat and the inner liner, at least one of the first sliding grommet and the second sliding grommet including an expansion space that is adapted to allow the inner liner and the outer liner to expand by different amounts.

5. The combustor liner of claim 1, wherein each of the grommet assemblies includes a first sliding grommet having a first part attached to the outer liner, a second part attached to the associated resonator throat, and an attachment cap that couples the first part to the second part, the first part and the second part being positioned such that an expansion space is defined therebetween, the expansion space being adapted to allow the outer liner to expand into the expansion space as a result of a temperature increase.

6. A resonator assembly for a gas turbine engine, comprising:

a circumferential first support band including an array of perforations thereon, the first support band including a shape resembling a frustum of a cone;

a substantially cylindrical second support band coupled to the first support band to form a raised mounting structure for a resonator;

a plurality of resonators annularly mounted on the second support band; and a resonator throat coupled to each of the plurality of resonators and extending through the raised mounting structure, each of the resonator throats being configured to fluidly couple an associated resonator to the gas turbine engine.

7. The resonator assembly of claim 6, wherein the first support band includes a first end having a first diameter and a second end having a second diameter greater than the first diameter, the second end of the first support band being coupled to the second support band.

8. The resonator assembly of claim 7, wherein the second diameter is greater than the first diameter by between about 0.5 inch (12.7 mm) and 2 inch (50.8 mm).

9. The resonator assembly of claim 6, wherein the array of perforations includes between about 20-150 perforations having a diameter between about 0.5 inch (6.35 mm) to 1 inch (25.4 mm).

10. The resonator assembly of claim 9, wherein the array of perforations includes 80 perforations having a diameter between about 0.5 inch (6.35 mm) and 1 inch (25.4 mm).

11. A method of operating a turbine engine, the turbine engine including a double walled combustor with an inner liner, an outer liner, and an annular cooling space therebetween, the outer liner including a plurality of air holes that allow air flow into the cooling space, comprising:

damping acoustic vibrations in the combustor using a plurality of resonators, each of the plurality of resonators being coupled to the outer liner such that a base of each of the plurality of resonators is positioned proud of an external surface of the outer liner; and annularly mounting the plurality of resonators on a substantially cylindrical second support band that is coupled to a circumferential first support band including an array of perforations thereon, and the first support band including a shape resembling a frustum of a cone, the second support band forming a raised mounting structure for each of the plurality of resonators, and the plurality of resonators being annularly mounted on the second support band such that a base of each of the resonators is separated from the outer liner to form a gap with an external surface of the outer liner, and a resonator throat extending from the base of each of the plurality of resonators, extending through the raised mounting structure, and penetrating the inner liner and the outer liner, the resonator throats fluidly coupling the plurality of resonators to the gas turbine engine; and allowing differential thermal expansion between the inner liner and the outer liner in the vicinity of a throat of each of the resonators by a grommet assembly associated with each throat, each of the grommet assemblies being configured to couple the associated throat to the combustor while allowing differential thermal expansion between the inner liner and the outer liner proximate the associated throat.

12. The method of claim 11, wherein the plurality of air holes on the outer liner include at least one air hole positioned below the base of each of the plurality of resonators, and the damping of acoustic vibrations includes flowing air into the cooling space through the at least one air hole.

13. The method of claim 11, wherein the inner liner includes a first sliding grommet of each of the grommet assemblies and the outer liner includes a second grommet of each of the grommet assemblies, and the allowing of differential thermal expansion includes allowing the outer liner to expand by a first amount into the first sliding grommet and allowing the inner liner to expand by a different second amount into the second sliding grommet.

* * * * *